US006487934B1

(12) United States Patent
Brandau et al.

(10) Patent No.: US 6,487,934 B1
(45) Date of Patent: Dec. 3, 2002

(54) HOUSING FOR A LOAD ADJUSTING DEVICE

(75) Inventors: Rüdiger Brandau, Alheim (DE); Rainer Lenz, Rotenburg (DE); Dieter Meyer, Rotenburg (DE); Wilhelm Bock, Bad Hersfeld (DE)

(73) Assignee: Mannesmann VDO AG, Frankfurt (DE)

( * ) Notice: Subject to any disclaimer, the term of this patent is extended or adjusted under 35 U.S.C. 154(b) by 19 days.

(21) Appl. No.: 09/598,145

(22) Filed: Jun. 21, 2000

(30) Foreign Application Priority Data

Jun. 23, 1999 (DE) ........................................ 199 28 631

(51) Int. Cl.[7] ................................................ F16H 57/02
(52) U.S. Cl. ..................................................... 74/606 R
(58) Field of Search ............................... 74/606 R, 607; 285/337, 364; 464/177; 55/502, 503, 493, 497, 511; D15/149; 292/87, 147; 296/63; 362/311; 297/440.22; 123/572

(56) References Cited

U.S. PATENT DOCUMENTS

| | | | | |
|---|---|---|---|---|
| 1,685,367 A | | 9/1928 | Lee et al. | |
| 2,358,607 A | | 9/1944 | Tinnerman | |
| 3,104,136 A | | 9/1963 | Merriman | |
| 3,353,341 A | | 11/1967 | Stripp | |
| 4,725,296 A | * | 2/1988 | Kurotobi | 55/497 |
| 5,046,474 A | * | 9/1991 | Percy | 123/572 |
| 5,292,432 A | * | 3/1994 | Jainek et al. | 55/502 X |
| 5,725,624 A | * | 3/1998 | Ernst et al. | 55/497 X |
| 5,853,577 A | * | 12/1998 | Gizowski et al. | 55/511 X |
| 6,053,072 A | * | 4/2000 | Schleuder | 74/606 R |

FOREIGN PATENT DOCUMENTS

| | | | |
|---|---|---|---|
| DE | 4010173 | | 10/1991 |
| DE | 19540586 | | 5/1997 |
| DE | 19630867 | | 2/1998 |
| DE | 19633513 | | 2/1998 |
| DE | 19724165 | | 12/1998 |
| DE | 29821109 | | 4/2000 |
| FR | 97-13050 | * | 4/1999 |
| JP | 8-320006 | * | 12/1996 |

OTHER PUBLICATIONS

Patent Abstracts of Japan, vol. 014, No. 068, Aug. 2, 1990, & JP 01288416 A, Nov. 20, 1989.

* cited by examiner

*Primary Examiner*—David A. Bucci
*Assistant Examiner*—Marcus Charles
(74) *Attorney, Agent, or Firm*—Martin A. Farher

(57) ABSTRACT

A housing (1) for a load adjusting device of an actuating drive for a throttle of an internal combustion engine, the housing having two housing parts (2, 3), has a circumferential sheet-metal strip (10). The sheet-metal strip (10) in each case engages behind an edge (8, 9) of the housing parts (2, 3). The housing parts (2, 3) are therefore prestressed uniformly against each other and reliably sealed off against each other.

6 Claims, 1 Drawing Sheet

HOUSING FOR A LOAD ADJUSTING DEVICE

FIELD AND BACKGROUND OF THE INVENTION

The invention relates to a housing for a load adjusting device of an actuator that determines the output of an internal combustion engine, in particular an actuator designed as a throttle, having two housing parts to accommodate a mechanism and/or a reversible actuating drive for the load adjusting device, and having a fixing means for connecting the housing parts positively, one under the other.

Housings of the above type are most often fixed to a throttle connecting piece and are known from internal combustion engines, for example of motor vehicles. The housing parts accommodate the load adjusting device generally referred to as E-gas. In the known housing, one of the housing parts has latching hooks to engage behind latching recesses in the respective other housing part. The latching hooks are in this case produced in one piece with their housing part.

The drawback with the known housing is that, as a result of the latching hooks, it is not possible to transmit any high prestressing forces to the housing parts. This means that the permanent tightness of the housing is not ensured.

SUMMARY OF THE INVENTION

The invention is based on the problem of configuring a housing of the type mentioned at the beginning in such a way that permanent tightness is reliably ensured.

According to the invention, this problem is solved by the fixing means being formed as a sheet-metal strip which is held by one of the housing parts and by the sheet-metal strip having means to engage behind the other housing part.

As a result of this configuration, the housing parts can be prestressed against each other with very high forces, given appropriate configuration of the sheet-metal strip. Furthermore, point loadings on the housing parts, such as are often produced when there is a low number of latching hooks, are avoided given a correspondingly wide configuration of the sheet-metal strip. The formation of cracks in the housing parts can therefore simply be ruled out, by virtue of the invention. This means that very high tightness of the housing is ensured. A further advantage of this configuration is that the housing parts can in each case be produced particularly cost-effectively, since no latching hooks or apertures for the latching hooks are needed.

According to an advantageous development of the invention, the prestressing forces transmitted from the sheet-metal strip to the housing parts can be distributed uniformly over the mutually adjoining regions of the housing parts if the sheet-metal strip has a flange shaped so as to engage behind a circumferential edge arranged on one of the housing parts. In this case, the sheet-metal strip can in each case engage with its edges behind a circumferential edge of the housing parts, it being possible for one of the engagement means to be preformed on the sheet-metal strip, while the other engagement means is produced by the flange during the assembly of the housing.

The housing according to the invention has particularly few components to be assembled if the housing part that is shaped like a pot in order to accommodate just a mechanism of the load adjusting device has the circumferential edge, and if the housing part that forms a cover is produced in one piece with the sheet-metal strip.

According to another advantageous development of the invention, the single-piece configuration of the sheet-metal strip with the housing part can be produced simply if one of the housing parts is produced from plastic in the injection-molding process, and if the sheet-metal strip is injection-molded onto this housing part. In order to be injection-molded on, the sheet-metal strip can hereby be simply inserted into the injection mold of the housing part. When the injection mold is filled with plastic, the sheet-metal strip is connected to the housing part.

According to another advantageous development of the invention, the sheet-metal strip is reliably connected to the housing part if, in its region in which the housing part is injection-molded around it, the sheet-metal strip has an angled-over section or recesses.

The sheet-metal strip could be produced from virtually any desired material. However, the sheet-metal strip has a particularly low weight and is able to connect the housing parts permanently to each other if the sheet-metal strip is produced from aluminum.

The sheet-metal strip could, for example, have a number of sections separated from one another. However, the assembly of the housing according to the invention is particularly cost-effective if the sheet-metal strip is shaped so as to run around the whole of the mutually adjoining region of the housing parts.

BRIEF DESCRIPTION OF THE DRAWING

The invention permits numerous embodiments. In order to illustrate its basic principle further, two of these embodiments are illustrated in the Figures of the drawing and will be described below. In the drawing

DETAILED DESCRIPTION OF THE PREFERRED EMBODIMENT

Figure 1:
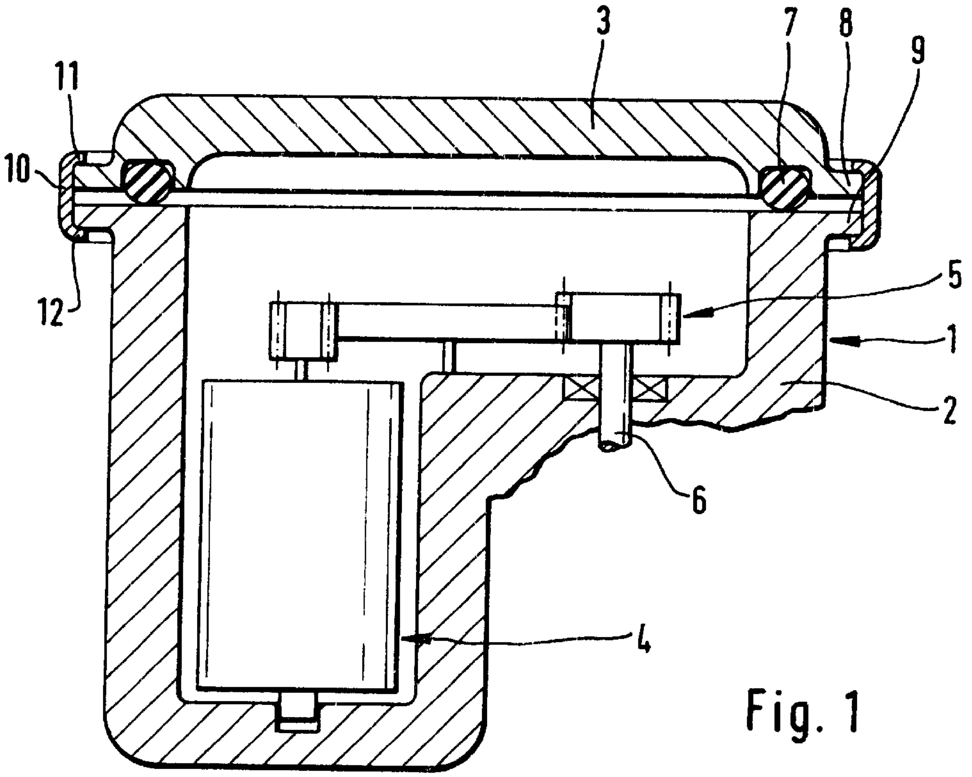
FIG. 1 shows a longitudinal section through a housing according to the invention, with a load adjusting device illustrated schematically.

FIG. 1 shows a housing 1 for a load adjusting device of an internal combustion engine of a motor vehicle, having a pot-like housing part 2 and a housing part 3 designed as a cover. The pot-like housing part 2 holds a reversible actuating drive 4 designed as an electric motor. The actuating drive 4 is connected to a throttle shaft 6 via a mechanism 5. The throttle shaft 6 is used to move an actuating element which is not illustrated but is designed, in particular, as a throttle flap. The output of the internal combustion engine can be controlled via the throttle. The housing 1 is sealed off by a seal 7 arranged between the housing parts 2, 3. The housing parts 2, 3 each have a circumferential edge 8, 9. In each case, a sheet-metal strip 10 engages behind the circumferential edges 8, 9. On its region that bears on the housing part 3 designed as a cover, the sheet-metal strip 10 has a pre-shaped edge 11, and on the region that bears on the edge 9 of the pot-like housing part 2, it has a flange 12. Given an appropriately stable configuration of the sheet-metal strip 10, the housing parts 2, 3 can be prestressed against each other with high forces. Since the sheet-metal strip 10 is configured so as to run around the entire housing 1, the prestressing forces are distributed uniformly over the housing parts 2, 3. The seal 7, which is configured to be very wide, likewise prevents point loadings on the housing parts 2, 3.

Figure 2:
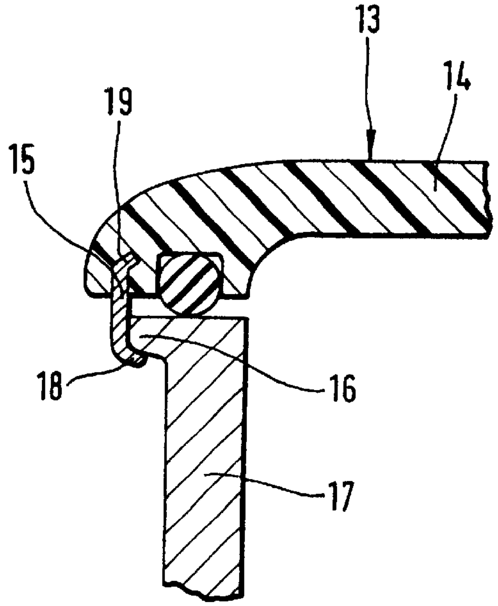
FIG. 2 shows a subarea of two housing parts connected to each other in a further embodiment of the housing according to the invention.

FIG. 2 shows a lateral subarea of a housing 13 in longitudinal section. In this case, a sheet-metal strip 15 is connected to a housing part 14. The housing part 14 is produced from plastic in the injection-molding process. That region of the sheet-metal strip 15 which projects from the housing part 14 designed as a cover has a flange 18 that engages behind an edge 16 of a pot-like housing part 17. The housing part 14 that is designed as a cover is injection-molded around the sheet metal strip. In the region of the sheet metal strip around which the housing part 14 is injection-molded, sheet-metal strip 15 has an angled-over section 19.

What is claimed is:

1. A housing for a load adjusting device of an actuator that determines the output of an internal combustion engine, said actuator formed as a throttle, said housing comprising two housing parts to accommodate at least one of a mechanism and a reversible actuating drive for the load adjusting device, and fixing means for connecting the housing parts positively, wherein the fixing means is a sheet-metal strip (10, 15) which is held by one of the housing parts (2, 3, 14, 17), and wherein the sheet-metal strip (10, 15) has means to engage behind the other housing part (2, 3, 14, 17) wherein, in a region of said shoot metal strip in which the housing part (14) is injection-molded therearound, the sheet-metal strip (15) has an angled-over section (19).

2. The housing as claimed in claim 1, wherein the sheet-metal strip (10, 15) has a flange (12, 18) shaped so as to engage behind a circumferential edge (9, 16) arranged on one of said housing parts (2, 17).

3. The housing as claimed in claim 1, wherein the housing part (17), is shaped to accommodate just a mechanism of the load adjusting device, and the housing part (17) has a circumferential edge (16), and wherein the other housing part (14) forms a cover and is in one piece with the sheet-metal strip (15).

4. The housing as claimed in claim 1, wherein one of the housing parts (14) is made of plastic in an injecting-molding process, and wherein the sheet-metal strip (15) is inserted into an injection-mold of said one housing part (14) and connected to said one housing part (14) upon filling of the injection-mold with plastic.

5. The housing as claimed in claim 1, wherein the sheet-metal strip (10, 15) is made from aluminum.

6. The housing as claimed in claim 1, wherein the sheet-metal strip is shaped so as to run around the whole of a mutually adjoining region of the housing parts.

* * * * *